US012150572B2

(12) United States Patent
Hodges et al.

(10) Patent No.: US 12,150,572 B2
(45) Date of Patent: Nov. 26, 2024

(54) LIMITED FLOW CUP

(71) Applicant: ProvaMed, Birmingham, AL (US)

(72) Inventors: Philip L Hodges, Birmingham, AL (US); Tom Weisel, Ventura, CA (US); Roger Pisarnwongs, Ventura, CA (US); Jessica Thomason, Birmingham, AL (US); Kellie Bornhoft, Birmingham, AL (US)

(73) Assignee: ProvaMed, Inc., Birmingham, AL (US)

( * ) Notice: Subject to any disclaimer, the term of this patent is extended or adjusted under 35 U.S.C. 154(b) by 209 days.

(21) Appl. No.: 17/843,664

(22) Filed: Jun. 17, 2022

(65) Prior Publication Data

US 2022/0400880 A1 Dec. 22, 2022

Related U.S. Application Data

(60) Provisional application No. 63/211,753, filed on Jun. 17, 2021.

(51) Int. Cl.

| | |
|---|---|
| ***A47G 19/22*** | (2006.01) |
| ***B65D 25/04*** | (2006.01) |
| ***G01F 11/26*** | (2006.01) |
| *A47J 31/40* | (2006.01) |
| *A61J 7/00* | (2006.01) |

(52) U.S. Cl.

CPC ......... *A47G 19/2272* (2013.01); *B65D 25/04* (2013.01); *G01F 11/262* (2013.01); *A47G 19/2288* (2013.01); *A47G 2200/048* (2013.01); *A47J 31/402* (2013.01); *A61J 7/0046* (2013.01)

(58) Field of Classification Search

CPC ........ G01F 11/262; G01F 19/00; G01F 22/00; A47G 2200/048; A47G 19/2272; B65D 25/04; B65D 1/04; A61J 7/0046; A61J 31/402

USPC .......................................................... 222/456

See application file for complete search history.

(56) References Cited

U.S. PATENT DOCUMENTS

| | | | | |
|---|---|---|---|---|
| 1,498,491 A * | 6/1924 | Stinson | G01F 11/261 | 222/456 |
| 2,693,301 A * | 11/1954 | Allen, Jr. | A47G 19/34 | 222/456 |
| 4,437,576 A * | 3/1984 | Barniak | A47G 19/2266 | 222/548 |
| 4,778,087 A | 10/1988 | Desai | | |
| 5,810,210 A | 9/1998 | Kelley et al. | | |
| 6,264,058 B1 * | 7/2001 | Porter | A47G 19/2266 | 220/709 |
| 6,471,085 B1 * | 10/2002 | Gallo | A47G 19/2288 | 374/150 |
| 6,755,318 B2 * | 6/2004 | Burke | G01F 11/262 | 220/759 |

(Continued)

OTHER PUBLICATIONS

WO2022266489—PCT/US2022/034069 International search report dated Aug. 24, 2022.

(Continued)

*Primary Examiner* — Nathan J Jenness
*Assistant Examiner* — Jennifer Castriotta
(74) *Attorney, Agent, or Firm* — Koren Anderson

(57) ABSTRACT

Improved limited flow drinking cups are provided wherein the redesigned cup prevents air bubbles from being trapped in the transfer reservoir and consistently dispenses a desired specific volume.

32 Claims, 9 Drawing Sheets

204
203
202
100
1543
1645
621
512

(56) References Cited

U.S. PATENT DOCUMENTS

| | | | | |
|---|---|---|---|---|
| 7,448,510 | B2 * | 11/2008 | Pavlopoulos | G01F 11/263 220/501 |
| 7,854,342 | B2 | 12/2010 | Burke et al. | |
| 2003/0019876 | A1 | 1/2003 | Burke et al. | |
| 2016/0243003 | A1 | 8/2016 | Battle | |
| 2018/0207064 | A1 | 7/2018 | Geels et al. | |

OTHER PUBLICATIONS

WO2022266489—PCT/US2022/034069 Written Opinion of Search Authority dated Aug. 24, 2022.

* cited by examiner

LIMITED FLOW CUP

RELATED APPLICATIONS

This application claims priority to provisional application Ser. No. 63/211,753 filed 17 Jun. 2021 which is hereby incorporated into this application in its entirety.

FIELD OF THE DISCLOSURE

This disclosure relates to limited flow cups as well as methods for making and using the same.

BACKGROUND OF THE DISCLOSURE

Dysphagia, a condition characterized by difficulty in swallowing food and liquids, can be present in patients suffering from stroke, head injury, neurological disorders, and other cognitive and motor problems. It may also occur as a result of aging, disability, or as a transient condition following some surgeries. As a result of dysphagia, patients may also suffer from dehydration and nutritional deficits.

When a person suffering from dysphagia attempts to swallow thin liquids, the bolus may tend to go down the bronchus and into the lungs, causing coughing, choking and even aspiration, which can lead to pneumonia. In order to maintain nutrition and hydration, these patients are sometimes given very small volumes, typically about one teaspoon. These smaller boluses can be more readily handled, often without aspiration problems. Various devices, liquid thickeners and other products have previously been developed to assist patients with dysphagia, but these typically do not allow a fixed volume to be delivered, with a normal drinking motion, without the assistance of a caregiver.

Limited flow drinking cups are designed to provide a fixed, metered amount of liquid to a user. A typical limited flow cup includes a cup body having a cover that defines an opening through which fluid can pass. Metering is provided by a three-piece assembly including (a) the cover, (b) a tube that is fixed to the cover at the opening and extends downward into the cup body, and (c) a small, self-contained metering cup mounted at the lower end of the tube. The metering cup has an open end that faces in a generally sideways direction. Prior to drinking, the cup body contains liquid up to a given liquid level, the metering cup is full of liquid, and the tube is filled with liquid up to the liquid level within the cup body. The metering cup and the portion of the tube that is below the liquid level in the cup body together define a metering chamber having a limited volume. When the user tilts the limited flow cup to a drinking position, the liquid within the metering chamber flows through the tube and out through the opening to the user. When the cup body is in the drinking position, the open end of the metering cup generally extends above the liquid level within the cup body, so that fluid cannot flow into the metering cup. As a result, only the volume within the metering chamber is dispensed during a single drinking motion.

Certain limited flow cups are disclosed in U.S. Pat. Nos. 6,755,318 and 7,854,342. The design of those cups however result, following a single drink by a user, with air being trapped in the metering chamber such that subsequent use may result in less than the desired volume of liquid being dispensed. This problem has been solved by the present limited flow cup disclosed herein, and described in more detail below, wherein the redesigned cup prevents air from being trapped and consistently dispenses a desired specific volume, e.g. 5 cc (cubic centimeters=milliliters), and utilizing a present venting system, to a user.

Accordingly, this disclosure thereby provides solutions to these and other art-recognized, and unrecognized, problems.

SUMMARY OF THE DISCLOSURE

This disclosure relates to limited flow cups as well methods for manufacturing and using the same. Provided herein in certain embodiments is a limited flow drinking cup for repeatedly dispensing a predetermined volume of liquid to a user each time the limited flow cup is tilted to a drinking position. In embodiments, the limited flow cup comprises an outer cup, an inner cup, a transfer reservoir and a straw configured for dispensing a predetermined volume of liquid to the user. In certain embodiments, the limited flow cup comprises a) an outer cup; b) an inner cup nested within the outer cup, wherein the inner cup is configured to contain a supply of the liquid in a main liquid reservoir and is in fluid communication with the outer cup; and, c) an angled transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup, wherein the angled transfer reservoir is configured to provide a ramp for air bubbles to move up and out into the main liquid reservoir, whereby air bubbles are not trapped in the transfer reservoir.

In certain other embodiments, the limited flow cup comprises a) an outer cup; b) an inner cup nested within the outer cup, wherein the inner cup is configured to contain a supply of the liquid and is in fluid communication with the outer cup; c) a transfer reservoir formed when the inner cup is fully seated within the outer cup and configured to measure the predetermined volume of the liquid to the user, wherein the transfer reservoir is in fluid communication via a first transfer slot with the supply of the liquid contained in the inner cup; and, d) a straw configured for dispensing the predetermined volume of the liquid to the user wherein the straw is in fluid communication with the transfer reservoir via a second transfer slot; wherein the transfer reservoir fills with the liquid providing the measured predetermined volume of liquid when in an upright position and is prevented from filling when the cup is tilted in the drinking position providing the user with a single predetermined volume of liquid and wherein the transfer reservoir is further configured to allow air to escape into the inner cup and not remain trapped in the transfer reservoir or the straw.

DETAILED DESCRIPTION

Figure 1:
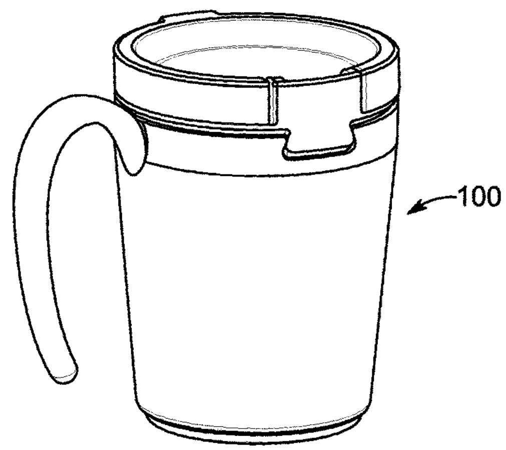
FIG. 1 shows a front view of an exemplary limited flow cup 100.
Figure 2:
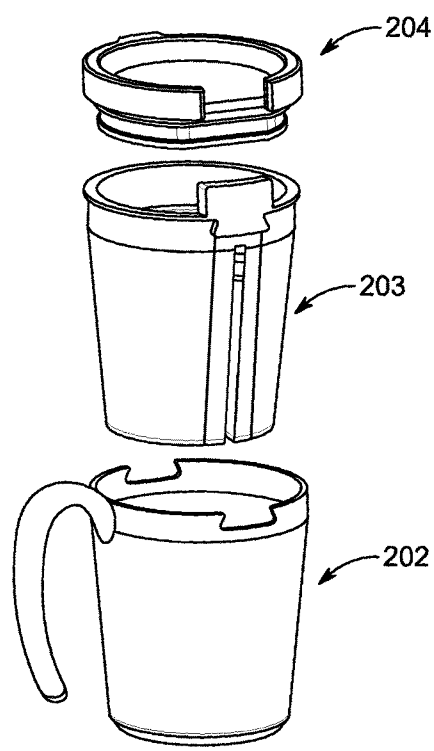
FIG. 2 is an expanded view of exemplary limited flow cup 100 from FIG. 1 showing a lid 204, an inner cup 203 and an outer cup 202.
Figure 3:
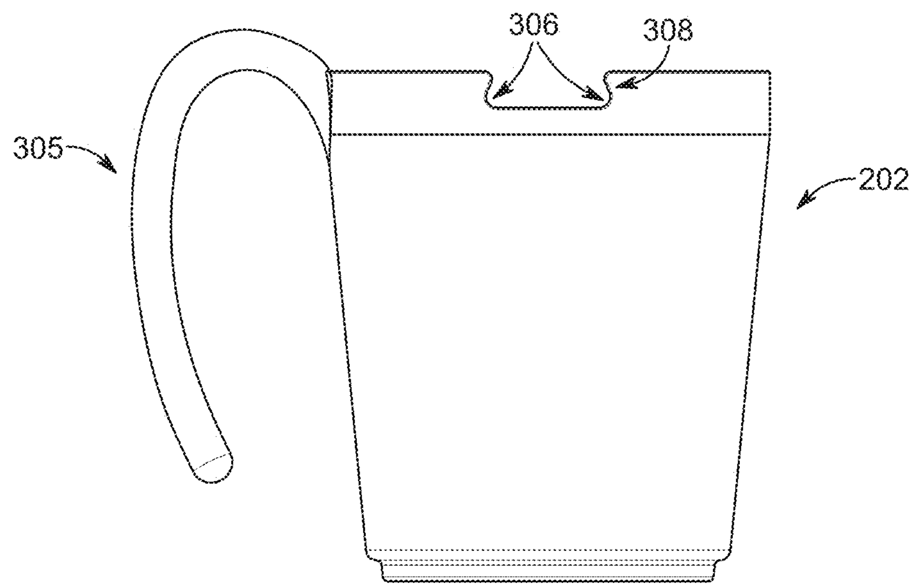
FIG. 3 is a side view of an exemplary outer cup 202 showing a handle 305, a cutout lock/seating feature 306 and a lip feature 308 of the cutout lock/seating feature 306.
Figure 4:
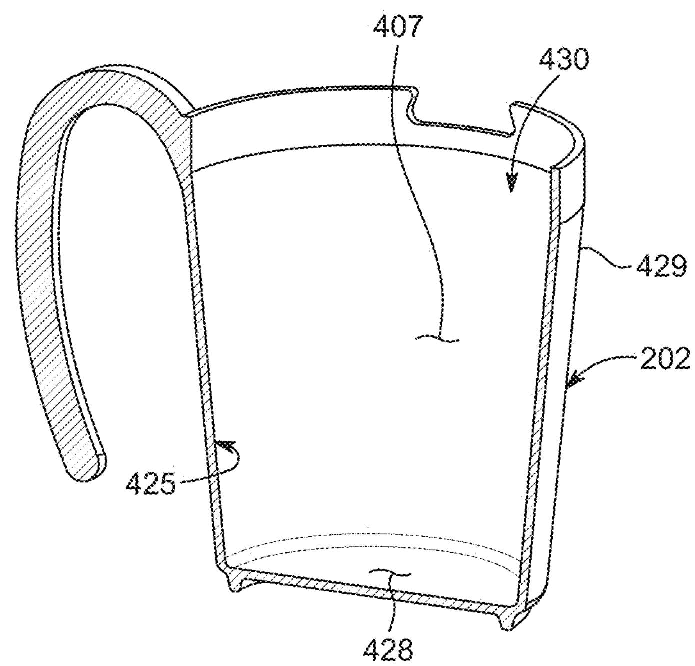
FIG. 4 is a cross section view of the outer cup 202 of FIG. 3 showing an open top 430, a cavity 407, an inner side surface 425 of the cavity 407, an external surface 429 of the cavity 407 and a bottom inner surface 428 of the cavity 407.

This disclosure relates to cups that provide limited release of fluid contained therein. Moreover, the present limited flow cup is configured to overcome previous problems related to repeated use wherein air would become trapped in a transfer reservoir. That configuration was accomplished by providing a main liquid reservoir in the inner cup that is in fluid communication via a first transfer slot with the transfer reservoir wherein the top portion of the transfer reservoir is angled to provide a ramp wherein air bubbles can move up and out into the main liquid reservoir. That configuration provides for an enhanced use of the present limited flow cup for the user and especially for repeated use wherein the user reliably obtains the same volume of the predetermined volume of liquid.

In certain embodiments provided herein, is a limited flow drinking cup for repeatedly dispensing a predetermined volume of liquid to a user each time the limited flow cup is tilted to a drinking position, comprising: a) an outer cup; b) an inner cup nested within the outer cup, wherein the inner cup is configured to contain a supply of the liquid in a main liquid reservoir and is in fluid communication with the outer cup; and, c) an angled transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup, wherein the angled transfer reservoir is configured to provide a ramp for air bubbles to move up and out into the main liquid reservoir, whereby air bubbles are not trapped in the transfer reservoir.

In certain other embodiments provided herein, is a limited flow drinking cup for dispensing a predetermined volume of liquid to a user each time the limited flow cup is tilted to a drinking position, comprising: a) an outer cup; b) an inner cup nested within the outer cup, wherein the inner cup is configured to contain a supply of the liquid and is in fluid communication with the outer cup; c) a transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup; and, d) a straw configured for dispensing the predetermined volume of the liquid to the user wherein the straw is in fluid communication with the transfer reservoir via a second transfer slot; wherein the transfer reservoir fills with the liquid providing the measured predetermined volume of liquid when in an upright position and is prevented from filling when the cup is tilted in the drinking position providing the user with a single predetermined volume of liquid and wherein the transfer reservoir is preferably further configured to allow air to escape into the inner cup and not remain trapped in the transfer reservoir or the straw. Additional details are provided below.

In exemplary embodiments, a limited flow cup 100 comprises an outer cup 202, an inner cup 203 and a lid 204. In embodiments, the outer cup 202 can be constructed of any suitable material for containing a liquid, preferably a hard plastic or lightweight metal such as aluminum and comprises a locking mechanism 306 and 308 for locking in place and fully seating the inner cup 203 within the outer cup 202 and a main cavity 407 wherein the inner cup 203 is placed to assemble the limited flow cup 100. In embodiments, a main cavity 407 of the outer cup 202 preferably has a round cross section but one of skill in the art understands the geometry may vary, wherein in certain embodiments the inner cup 203 locks via the locking mechanism 306 and 308 and seats within the outer cup 202. In embodiments, the outer cup 202 further comprises a handle 305 for easier control and use of the limited flow cup 100. See FIGS. 1-4. In certain embodiments, the limited flow cup 100 may comprise one handle 305 on either the left or right depending on the user, or in certain other embodiments, the limited flow cup 100 comprises two handles 305. In embodiments, the placement of the handle 305, and to accommodate right or left-handed users, is accomplished by placing the inner cup 203 in the inner 202 and rotating by 180 degrees to change the orientation of the handle 305 relative to the position of the mouthpiece 609.

Figure 5:
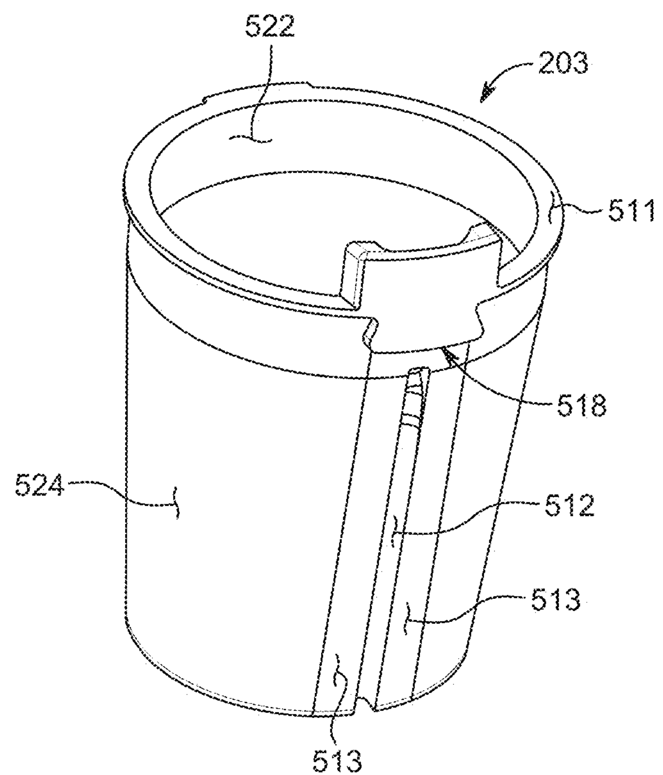
FIG. 5 is an upright view of the inner cup 203 showing a flange 511, a straw 512, a straw forming surface 513, a front tab lock/seating feature 518, an inner cup duct wall 522, and an outer surface 524 of the inner cup 203.
Figure 6:
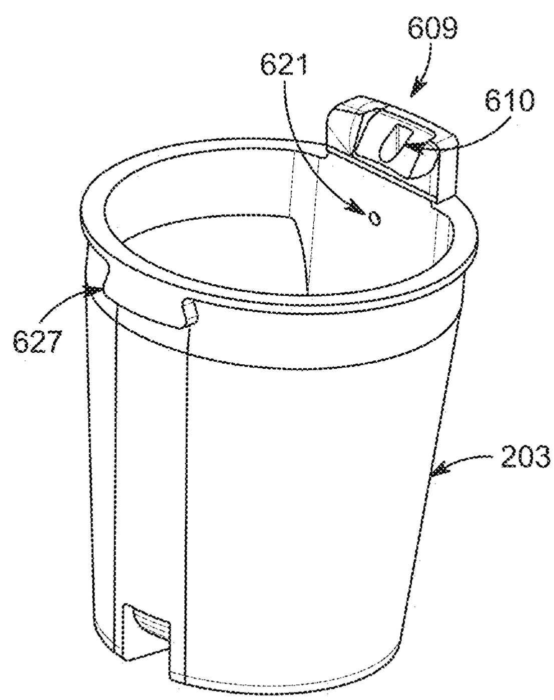
FIG. 6 is an upright view of the inner cup 203 showing a mouthpiece 609, a channel of the mouthpiece 610, a vent hole 621 and outer tab lock/seating features 627.
Figure 7:
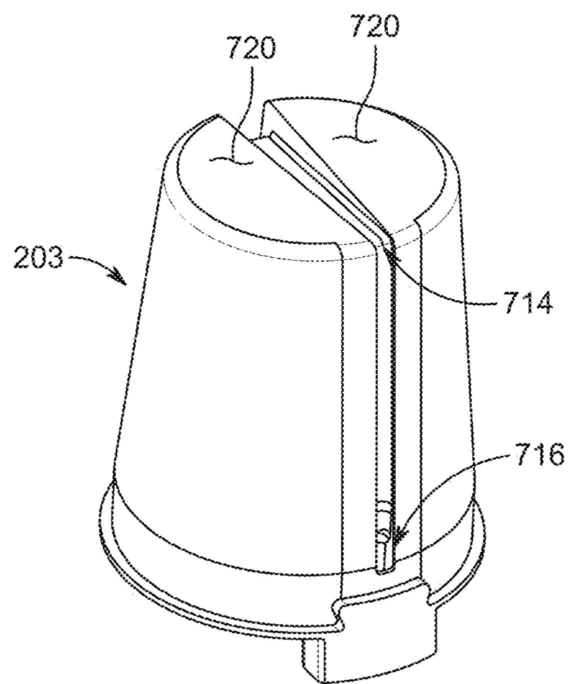
FIG. 7 is an inverted view of the inner cup 203 showing a second transfer slot 714, a third transfer slot 716, and an outer bottom surface 720.
Figure 8:
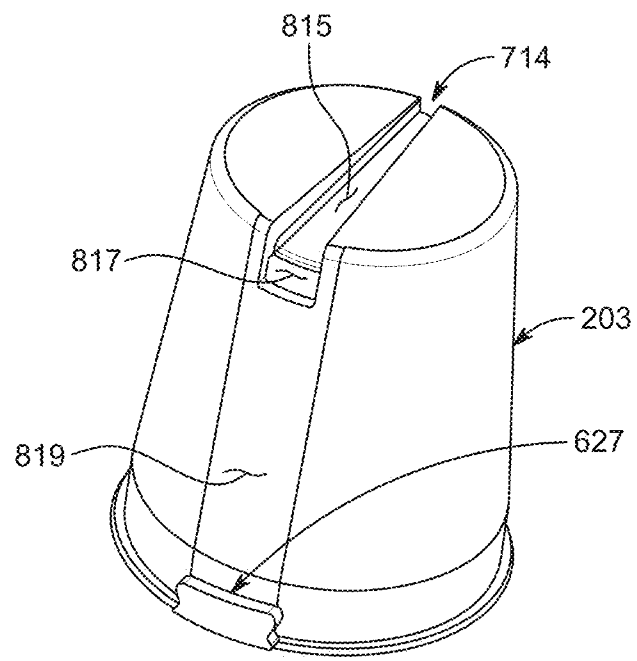
FIG. 8 is an inverted view of the inner cup 203 showing the second transfer slot 714, a transfer reservoir 815, a first transfer slot 817, a backside surface 819 and a back tab lock/seating feature 627.
Figure 9:
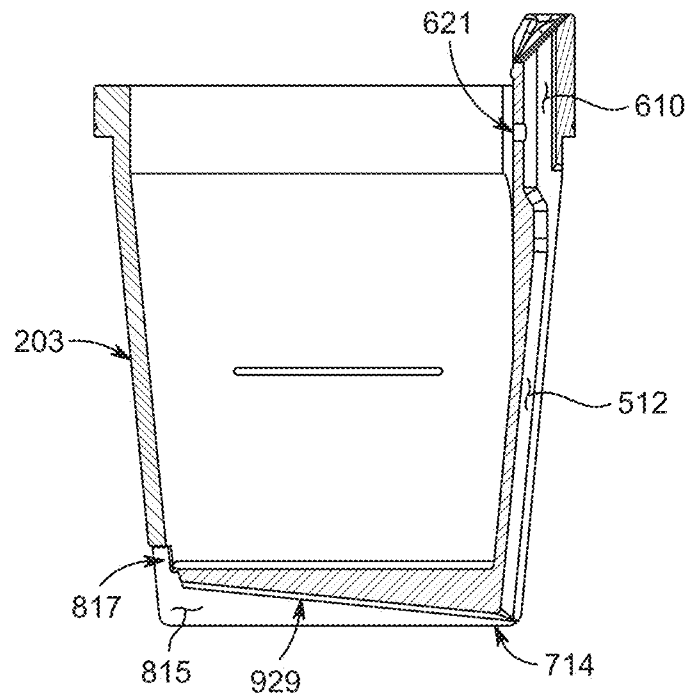
FIG. 9 is a cross section view of the inner cup 203 showing the transfer reservoir 815, the channel of the mouthpiece 610, the straw 512, the second transfer slot 714, the first transfer slot 817, the vent hole 621 and a tapered upper surface 929 of the transfer reservoir 815.
Figure 10:
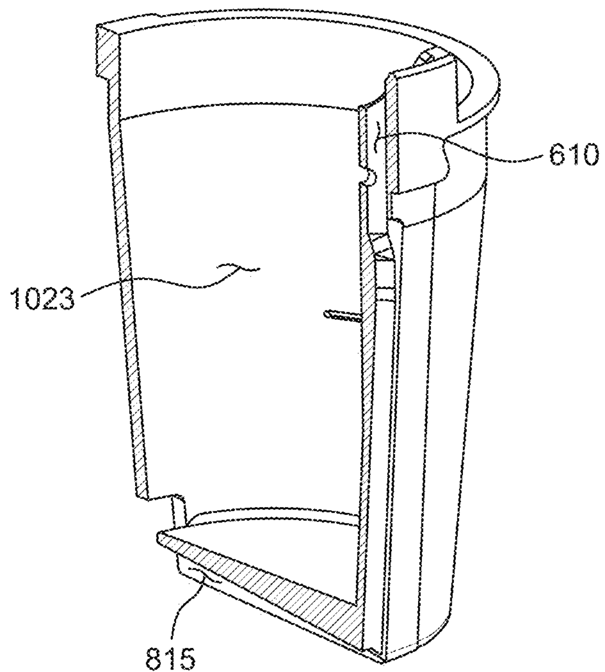
FIG. 10 is a cross section view of the inner cup 203 of FIG. 9 showing the transfer reservoir 815, the channel of the mouthpiece 610 and a main fluid/liquid reservoir 1023.

In embodiments provided herein, is an inner cup 203 comprising a front tab lock/seating feature 518, a back tab lock/seating feature 627, each of which are configured to mate with the locking mechanism 306 of the outer cup 202 and remain locked and fully seated via the lip feature 308 with the lip lock/seating feature 627. In further embodiments, the inner cup 203 comprises a straw 512 connected to a mouthpiece 609. In certain embodiments, the inner cup 203 comprises a transfer reservoir 815 which is in fluid communication with a main liquid reservoir 1023 via first transfer slot 817 and provides the configuration for filling the transfer reservoir 815 with the predetermined volume of liquid when the limited flow cup 100 is in an upright non-drinking angle position. See FIGS. 5 and 6 for an upright view of the inner cup 203; FIGS. 7 and 8 for an inverted view of the inner cup 203; FIGS. 9 and 10 for a cross section view of the inner cup 203. In embodiments, the transfer reservoir 815 is in fluid communication with the straw 518 via a second transfer slot 714 and provides the configuration for dispensing the measured predetermined volume of the liquid when the limited flow cup 100 is in a tilted drinking angle position. See FIG. 17.

In certain embodiments, the inner cup 203 is constructed of a pliable rubber but can be made from a variety of materials including silicone and thermoplastic elastomer (TPE). In embodiments the inner cup 203 surface 524 generally follows the shape of the outer cup 202 to ensure a tight connection between outer cup 202 and inner cup 203. The front tab lock/seating feature 518 and back tab lock/seating feature 627 are positioned such that each slide into the cutout lock/seating feature 306 of the outer cup 202 and lock in place when the locking tabs, lip lock/seating feature 627, are positioned into the locking cutouts, lip feature 308. In certain embodiments, front tab lock/seating feature 518 is positioned on the side of the cup comprising the straw 512, the straw surface 513, and the lip lock/seating feature 627 are a component of 518 and positioned on the side of the limited flow cup 100 comprising mouthpiece 609 and channel of the mouthpiece 610. When locked in place, the straw surface 513 and the backside surface 819 mate intimately with the inner surface of the outer cup 425 such that a seal is created around a portion of the straw 512. In embodiments the inner cup 203 also preferably comprises the transfer reservoir 815 positioned within exterior surface of inner cup 203 bottom surface 720. The transfer reservoir 815 is preferably in fluid communication with the first transfer slot 817 and the second transfer slot 714. A similar sealing arrangement occurs around the transfer reservoir 815 when the inner cup bottom surface 720 is pushed against the outer cup bottom surface 428. Flange 511 of the inner cup 203 assists with mating between the inner cup 203 and outer cup 202 to minimize fluid leakage.

In embodiments, the first transfer slot 817 allows fluid flow between the main liquid reservoir 1023 and the transfer reservoir 815. The transfer reservoir 815 size determines the volume of each drink available to the user. In certain embodiments the limited flow cup 100 provides the user with 5 ml (5 cc) of fluid per drink. In certain other embodiments, the limited flow cup 100 provides the user with 10 ml (10 cc) of fluid per drink. In embodiments, to minimize trapped air between individual drinks (e.g., single dispensing of the predetermined volume of liquid) the transfer reservoir 815 tapers (i.e., narrows) as it approaches the straw 512 helping to remove trapped air bubbles with increasing flow velocity. In embodiments, the tapering provides a ramp, or upward angle, towards the first transfer slot 817 wherein air bubbles can move up and out of the transfer reservoir 815. Accordingly, the transfer reservoir 815 tapers up (e.g., tapered upper surface 929) towards the first transfer slot 817 as shown in FIG. 9 so that when the cup is placed in an upright position after a drink the air in the transfer reservoir 815 will slide or roll up through the first transfer slot 817 while liquid moves into the transfer reservoir 815 through the first transfer slot 817.

In embodiments, a second transfer slot 714 exists between the transfer reservoir 815 and the straw 512 as a conduit for fluid transfer. The fluid flows through the straw 512 then through the mouthpiece 609 via the channel of the mouthpiece 610 and into the user's mouth. The mouthpiece vent hole 621 connects to the channel of the mouthpiece 610 and with the aid of the lid 204 will be part of an air flow feature to aid in dispersion of only the predetermined volume of liquid to the user as measured by the transfer reservoir 815.

Figure 11:
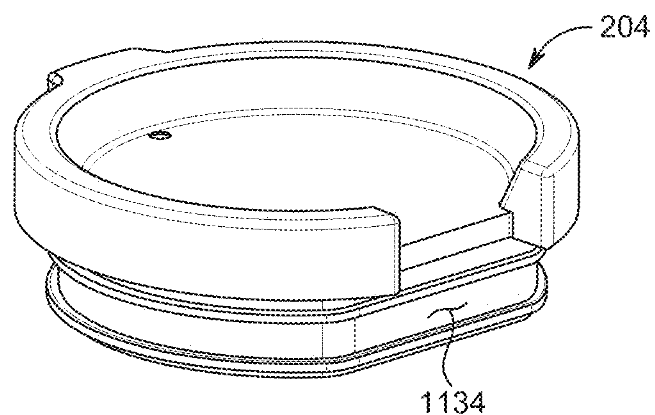
FIG. 11 is an expanded view of the lid 204 showing a duct 1134.
Figure 12:
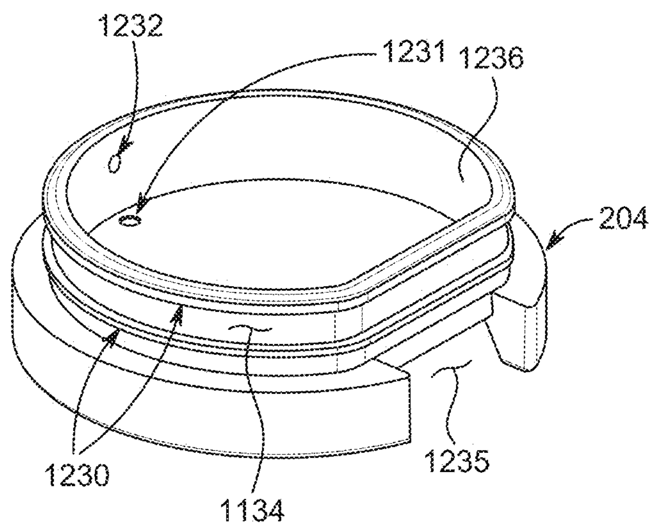
FIG. 12 is an inverted expanded view of the lid 204 interior surface 1236 showing two seal beads 1230 that encircle the lid forming the duct 1134, a lid vent hole 1231, a duct vent hole 1232 and a gap 1235 that fits the mouthpiece 609 of FIG. 6 when the lid is placed on the limited flow cup 100.
Figure 13:
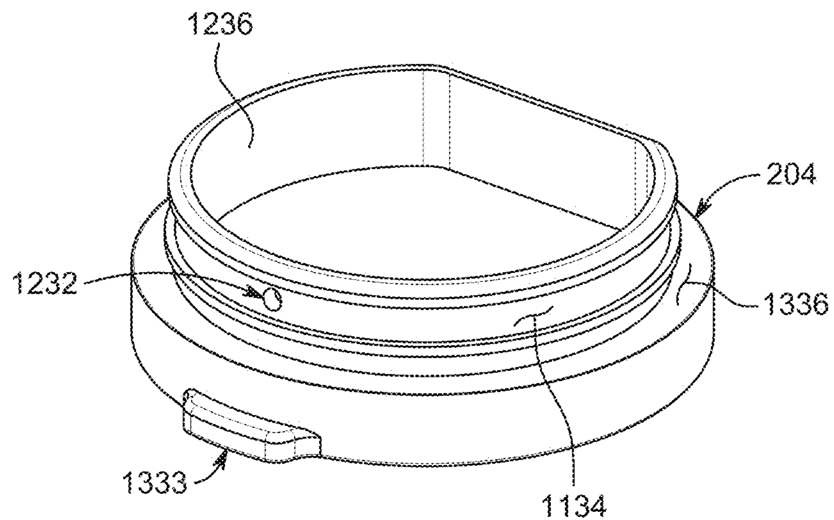
FIG. 13 is an inverted expanded view of the lid 204 showing the duct vent hole 1232, a lid removal tab 1333, the duct 1134 and a flange 1336.

In certain embodiments provided herein is a lid 204 as illustrated in FIGS. 11 to 13. In embodiments, lid 204 is manufactured using a hard plastic but can be made from a variety of materials. Lid 204 comprises a flange 1336 that provides a stop point against the flange 511 of the inner cup 203. In embodiments, removal tab 1333 is included to aid the removal of the lid 204 from the inner cup 203 after use and for cleaning.

In embodiments, lid 204 comprises a gap 1235 to fit around the mouthpiece 609. In preferred embodiments, two seal beads 1230 encircle the entire lid 204 such that a duct 1134 is created between the two seal beads 1230. In embodiments, lid 204 comprises a duct vent hole 1232 connecting the duct 1134 to the underside of the lid 204. The lid vent hole 1231 connects the underside of the lid 204 to the outside atmosphere. The conduit created by the channel of the mouthpiece 610, mouthpiece vent hole 621, duct 1134, duct vent 1232, and lid vent hole 1231 prevents the user from drawing excess fluid out of the main reservoir 1023 since any sucking motion will pull air from outside the limited flow cup 100 instead of additional liquid.

In embodiments, the limited flow cup 100 comprises a vent system that prevents excess liquid from being dispensed to the user. The vent system is configured so that a user, if they were to suck on the mouthpiece (e.g., as a user would a straw), will not pull any fluid wherein the vent system acts as a bypass.

Figure 14:
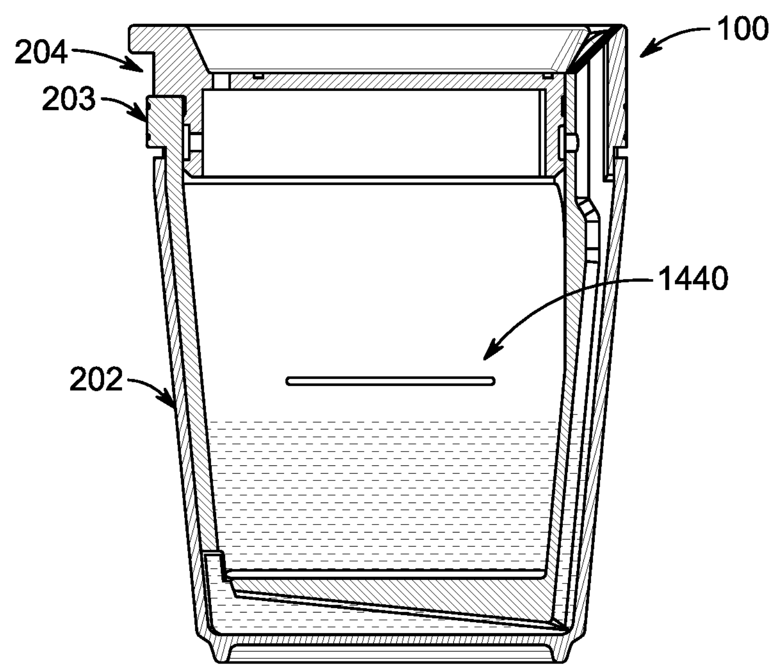
FIG. 14 is a cross section view of an assembled limited flow cup 100 of FIG. 1 showing the outer cup 202, the inner cup 203 fully seated in the outer cup 202, the lid 204, and a maximum fill line 1440 for the supply of liquid.
Figure 15:
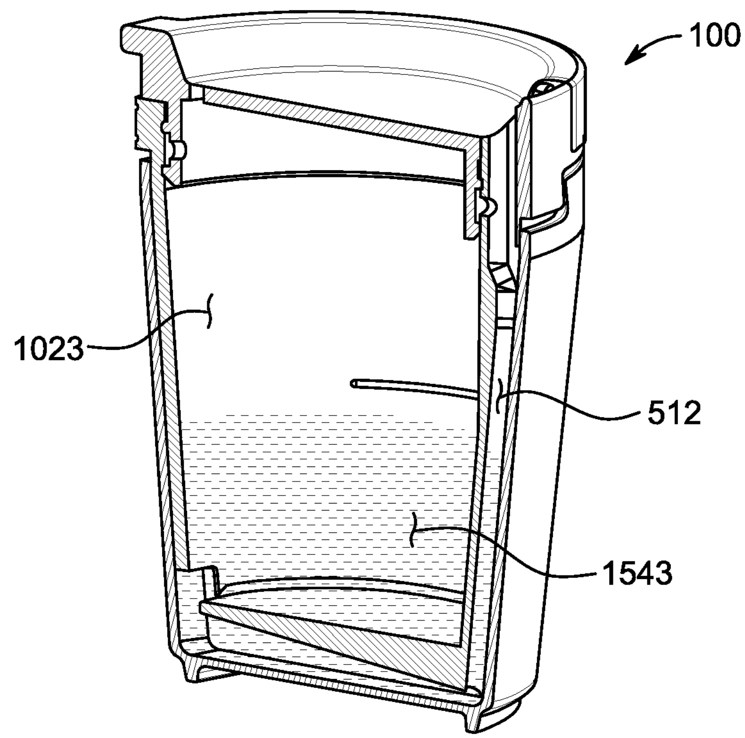
FIG. 15 is a cross section view of an assembled limited flow cup 100 of FIG. 1 showing a supply of liquid 1543 in the main fluid/liquid reservoir 1023 of the inner cup 203 of FIG. 2 and the straw 512.

FIGS. 14 and 15 show a cross section of the assembled limited flow cup 100 with the main fluid reservoir 1023 filled below the "MAX FILL" line 1440 ("fill line"). This fill line 1440 represents the amount of liquid 1543 that the cup can hold without having vent holes plugged or continuous flow occur when tipping the cup for a drink. In this position it should be noted that the fluid level in the straw 512 is the same as that in main reservoir 1023.

Figure 16:
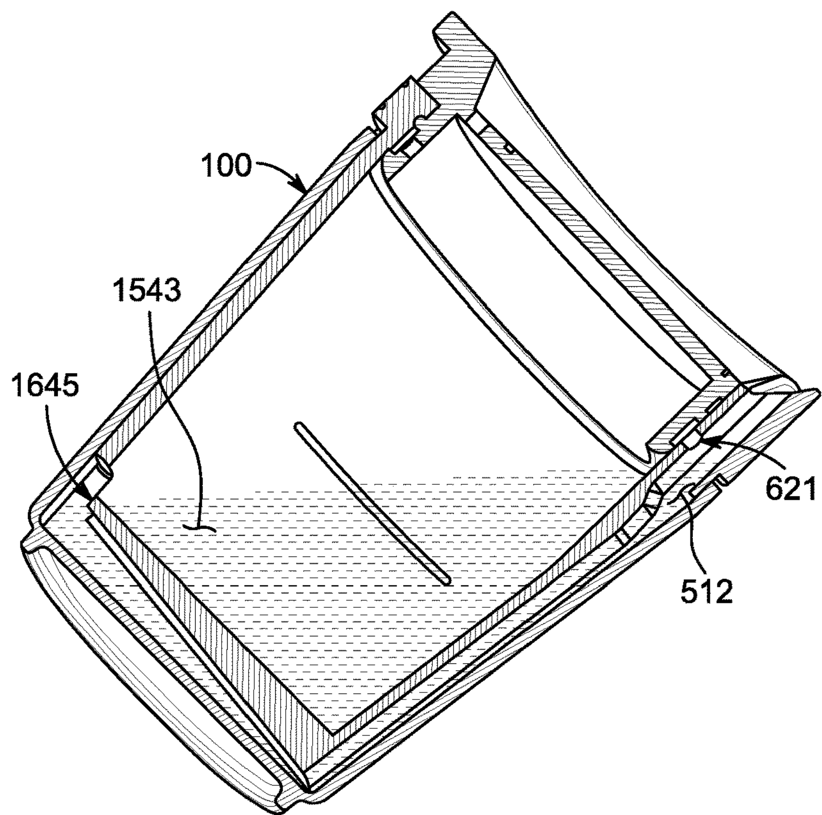
FIG. 16 is a cross section view of an assembled limited flow cup 100 of FIG. 1 in a tilted pre-drinking angle position showing the straw 512, the vent hole 621, the supply of liquid 1543 and a transfer reservoir edge 1645.
Figure 17:
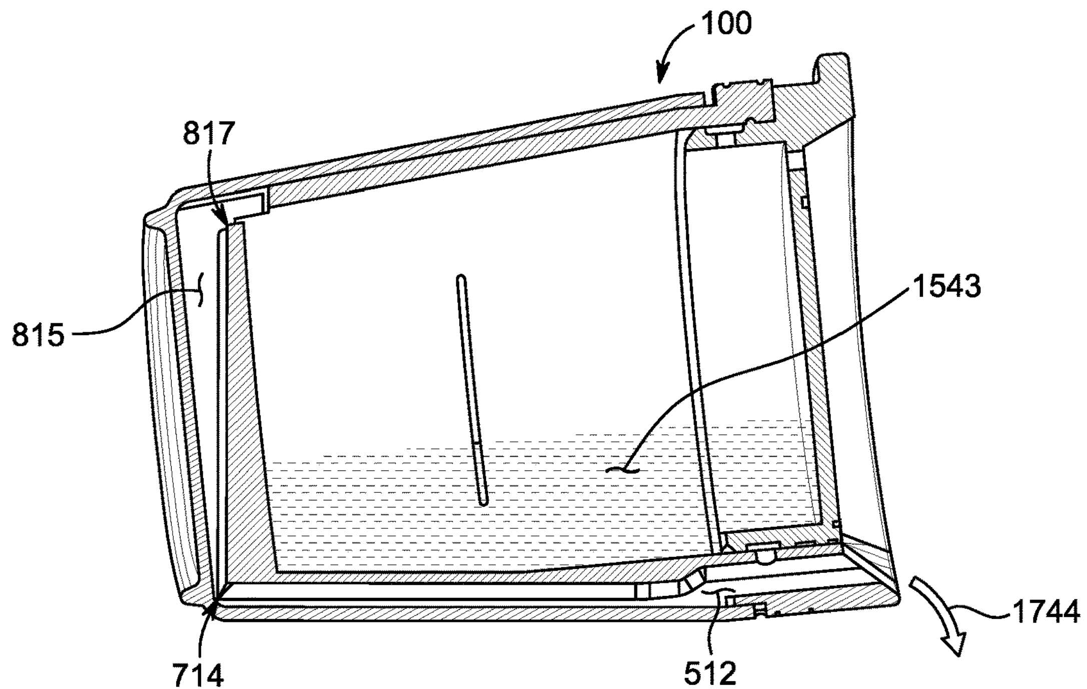
FIG. 17 is a cross section view of an assembled limited flow cup 100 of FIG. 1 in a tilted drinking angle position showing the straw 512, the second transfer slot 714, the transfer reservoir 815, the first transfer slot 817, the supply of liquid 1543, and dispensing of a predetermined volume of the liquid 1744.
Figure 18:
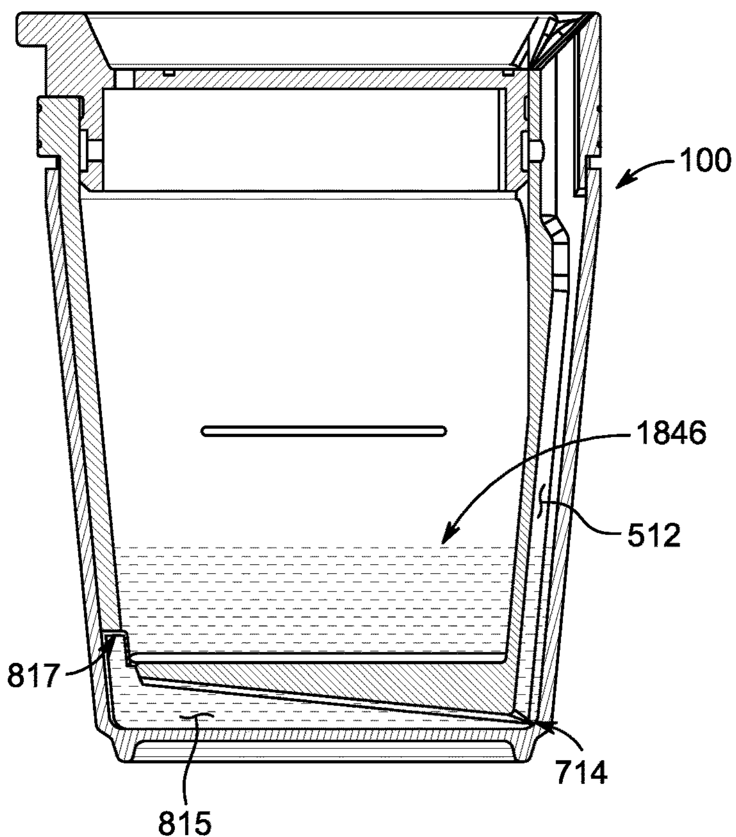
FIG. 18 is a cross section view of an assembled limited flow cup 100 of FIG. 1 in an upright position, showing the straw 512, the second transfer slot 714, the transfer reservoir 815, the first transfer slot 817, and the liquid level 1846.

The assembled cup 100 wherein inner cup 203 is fully seated within the outer cup 202 is illustrated in a partially tilted position in FIG. 16 and a tilted drinking angle position in FIG. 17. As the limited flow cup 100 is tilted, the level in the straw 512 increases. The MAX FILL line 1440 is set such that when tilted the fluid level is below the transfer reservoir edge 1645 before the level in the straw 512 reaches the mouthpiece vent 621. This is so the user can only suck the contents of the transfer reservoir 815 and straw 512 before air is vented from outside the cup 100 via the mouthpiece vent 621. After the predetermined volume of liquid is dispensed (e.g., a drink) to the user, the limited flow cup 100 is placed in the upright position again allowing the liquid to refill the transfer reservoir 815 and the straw 512 via the first transfer slot 817 and second transfer slot 714 to a slightly lower level 1846 as some of the liquid has been removed from the main liquid reservoir 1023. See FIG. 18. The drinking process is then repeated.

Figure 19:
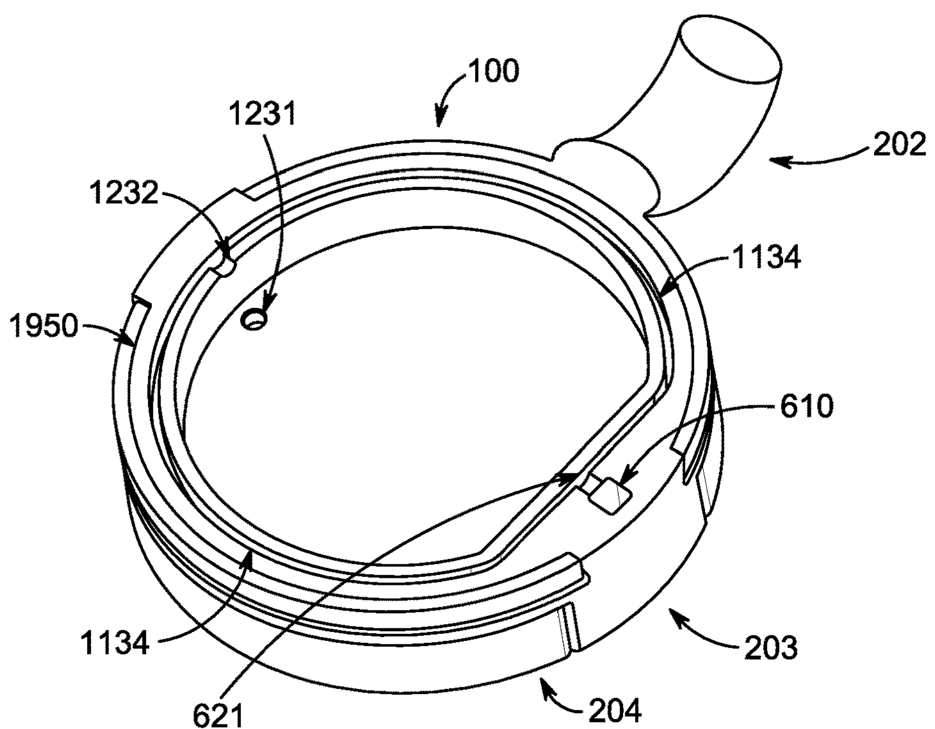
FIG. 19 is an expanded cross section view of the limited flow cup 100 with the inner cup 203, outer cup 202 and lid 204 shown. Also shown are the mouthpiece channel 610, the vent hole 621, the lid vent hole 1231, the duct vent hole 1232, the duct 1134 and the outer/inner cup seal line 1950.

FIG. 19 is used to illustrate the venting process of the limited flow cup 100 in more detail. The mouthpiece channel 610 is attached to two arms of the duct 1134 through the mouthpiece vent 621. The ducts 1134 then transfer air flow from the outside atmosphere through the duct vent 1232 and lid vent 1231. The lid vent 1231 is positioned opposite the mouthpiece 609 such that the vent cannot be blocked by fluid while drinking. The purpose for this vent system is that if the user is trying to suck out fluid instead of just allowing it to fall into their mouth, he/she will begin to suck air through the vent system once the fluid from the straw 512 and transfer reservoir 815 are empty.

In certain embodiments, the limited flow cup 100, including each of the three parts/components (the lid 204, outer cup 202 and inner cup 203) are each made of a material compatible with manual washing and/or use in a dishwasher. One of skill in the art understands these materials to include various plastics, silicone, light weight metals and alloys (such as aluminum), and other well-known food safe manufacturing materials.

In certain embodiments, the limited flow cup 100, and the three components (the lid 204, outer cup 202 and inner cup 203) are manufactured wherein each of the three components are molded separately using processes well known in the art. Once molded the three components are assembled providing the limited flow cup 100.

In certain embodiments, this disclosure provides the following specific embodiments of a limited flow cup:

Specific Embodiment A: A limited flow drinking cup 100 for dispensing a predetermined volume of liquid to a user each time the limited flow cup 100 is tilted to a drinking position, comprising: a) an outer cup 202; b) an inner cup 203 nested within the outer cup 202, wherein the inner cup 203 is configured to contain a supply of the liquid 1543 in a main liquid reservoir 1023 and is in fluid communication with the outer cup 202; c) a transfer reservoir 815 formed when the inner cup 203 is fully seated within the outer cup 202 and configured to measure the predetermined volume of liquid to the user, wherein the transfer reservoir 815 is in fluid communication via a first transfer slot 817 with the supply of the liquid 1543 contained in the inner cup 203; and, d) a straw 512 configured for dispensing the predetermined volume of the liquid to the user wherein the straw is in fluid communication with the transfer reservoir 815 via a second transfer slot 714; wherein the transfer reservoir 815 fills with the liquid providing the measured predetermined volume of liquid when in an upright position and is prevented from filling when the cup is tilted in the drinking position providing the user with a single predetermined volume of liquid and wherein the transfer reservoir 815 is further configured to allow air to escape into the inner cup 203 and not remain trapped in the transfer reservoir 815 or the straw 512.

Specific Embodiment B: The limited flow cup of Specific Embodiment A, further comprising a lid 204.

Specific Embodiment C: The limited flow cup of Specific Embodiment B, wherein the lid 204 comprises a lid removal tab 1333.

Specific Embodiment D: The limited flow cup of Specific Embodiment B, wherein the lid 204 comprises a vent system (1230; 1134; 1231; 1232), when seated on outer and inner cup assembly, that prevents excess liquid from being dispensed to the user.

Specific Embodiment E: The limited flow cup of Specific Embodiment A, wherein the inner cup 203 comprises a pliable rubber polymer.

Specific Embodiment F: The limited flow cup of Specific Embodiment A, wherein the inner cup 203 comprises silicone polymers.

Specific Embodiment G: The limited flow cup of Specific Embodiment A, wherein the transfer reservoir 815 comprises an upper surface angle 929 from the second transfer slot 714 to the first transfer slot 817 of greater than 3 degrees whereby air bubbles move from the transfer reservoir 815 to the main liquid reservoir 1023.

Specific Embodiment H: The limited flow cup of Specific Embodiment A, wherein the transfer reservoir 815 comprises sidewalls that tapper from the first transfer slot 714 to the second transfer slot 817 at an angle from about 5 to 20 degrees. See FIGS. 7 and 8.

Specific Embodiment I: The limited flow cup of Specific Embodiment B, wherein the lid 204 comprises a gap for a mouthpiece 1235 of the inner cup 203 aligning the outer cup 202, inner cup 203 and lid 204.

Specific Embodiment J: The limited flow cup of Specific Embodiment A, wherein the inner cup 203 is fully seated in the outer cup 202 via a tab lock/seating feature (518; 627) mated with a cutout lock/seating feature (306/308).

Specific Embodiment K: The limited flow cup of any preceding Specific Embodiment further comprising liquid.

Specific Embodiment L: A method for using the limited flow cup of any preceding Specific Embodiment, the method comprising filling and/or drinking a fluid contained within the cup.

Specific Embodiment M: A method for manufacturing the limited flow cup of any one of Specific Embodiments A to K, the method comprising connecting the outer cup 202 and the inner cup 203 to provide an assembled limited flow cup 100 such that fluid can be contained within the same and the amount of contained fluid released upon tilting of the assembled cup is limited. See FIG. 17.

Specific Embodiment AA: A limited flow drinking cup for repeatedly dispensing a predetermined volume of liquid to a user each time the limited flow cup is tilted to a drinking position, comprising: a) an outer cup; b) an inner cup nested within the outer cup, wherein the inner cup is configured to contain a supply of the liquid in a main liquid reservoir and is in fluid communication with the outer cup; and, c) an angled transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup, wherein the angled transfer reservoir is configured to provide a ramp for air bubbles to move up and out into the main liquid reservoir, whereby air bubbles are not trapped in the transfer reservoir.

Specific Embodiment BB: The limited flow cup of claim 1, comprising a straw configured for dispensing the predetermined volume of the liquid to the user wherein the straw is in fluid communication with the angled transfer reservoir via a second transfer slot.

Specific Embodiment CC: The limited flow cup of Specific Embodiment AA, further comprising a vent system that prevents excess liquid from being dispensed to the user.

Specific Embodiment DD: The limited flow cup of Specific Embodiment AA, further comprising a lid.

Specific Embodiment EE: The limited flow cup of Specific Embodiment DD, wherein the lid comprises a lid removal tab.

Specific Embodiment FF: The limited flow cup of Specific Embodiment DD, wherein the lid comprises a vent system, when seated on outer and inner cup assembly, that prevents excess liquid from being dispensed to the user.

Specific Embodiment GG: The limited flow cup of Specific Embodiment CC or FF, wherein the vent system comprises a channel, a mouthpiece vent hole, a duct, duct vent, and a lid vent hole, wherein the system prevents the user from drawing excess fluid out of the main reservoir.

Specific Embodiment HH: The limited flow cup of Specific Embodiment AA, wherein the inner cup comprises a pliable rubber polymer.

Specific Embodiment II: The limited flow cup of Specific Embodiment AA, wherein the inner cup comprises a silicone or a thermoplastic elastomer (TPE).

Specific Embodiment JJ: The limited flow cup of Specific Embodiment DD, wherein the lid comprises a gap for a mouthpiece of the inner cup and/or a lid flange that provides a stop point against a flange of the inner cup.

Specific Embodiment KK: The limited flow cup of Specific Embodiment AA, wherein the angled transfer reservoir comprises an upper surface angle from a second transfer slot to the first transfer slot of greater than 3 degrees whereby air bubbles move from the transfer reservoir to the main liquid reservoir.

Specific Embodiment LL: The limited flow cup of Specific Embodiment AA, wherein the transfer reservoir comprises sidewalls that tapper from the first transfer slot to a second transfer slot at an angle from about 5 to 20 degrees.

Specific Embodiment MM: The limited flow cup of Specific Embodiment AA, wherein the inner cup is fully seated in the outer cup via a tab lock/seating feature mated with a cutout lock/seating feature.

Specific Embodiment NN: The limited cup of Specific Embodiment BB, wherein the main liquid reservoir comprises a fill line configured such that when the limited flow cup is tilted the liquid level is below a transfer reservoir edge of the first transfer slot the level of fluid in the straw reaches a mouthpiece vent.

Other Specific Embodiments and aspects of this disclosure will also be apparent to those of ordinary skill in the art.

The terms "about", "approximately", and the like, when preceding a list of numerical values or range, refer to each individual value in the list or range independently as if each individual value in the list or range was immediately preceded by that term. The terms mean that the values to which the same refer are exactly, close to, or similar thereto. Optional or optionally means that the subsequently described event or circumstance can or cannot occur, and that the description includes instances where the event or circumstance occurs and instances where it does not. Ranges may be expressed herein as from about one particular value, and/or to about another particular value. When such a range is expressed, another aspect includes from the one particular value and/or to the other particular value. Similarly, when values are expressed as approximations, by use of the antecedent about or approximately, it will be understood that the particular value forms another aspect. It will be further understood that the endpoints of each of the ranges are significant both in relation to the other endpoint, and independently of the other endpoint. Ranges (e.g., 90-100%) are meant to include the range per se as well as each independent value within the range as if each value was individually listed.

All references cited within this disclosure are hereby incorporated by reference in their entirety. Certain embodiments are further described in the following examples. These embodiments are provided as examples only and are not intended to limit the scope of the claims in any way.

While certain embodiments have been described in terms of the preferred embodiments, it is understood that variations and modifications will occur to those skilled in the art. Therefore, it is intended that the appended claims cover all such equivalent variations that come within the scope of the following claims.

What is claimed is:

1. A limited flow drinking cup for repeatedly dispensing a predetermined volume of liquid to a user each time the limited flow cup is tilted to a drinking position, comprising:

a) an outer cup;

b) an inner cup nested within the outer cup, wherein the inner cup is configured to contain a supply of the liquid in a main liquid reservoir and is in fluid communication with the outer cup; and, c) an angled transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup, wherein the angled transfer reservoir is configured to provide a ramp for air bubbles to move up and out into the main liquid reservoir, whereby air bubbles are not trapped in the transfer reservoir.

2. The limited flow cup of claim 1, further comprising a straw configured for dispensing the predetermined volume of the liquid to the user wherein the straw is in fluid communication with the angled transfer reservoir via a second transfer slot.

3. The limited flow cup of claim 2, wherein the main liquid reservoir comprises a fill line configured such that when the limited flow cup is tilted the liquid level is below a transfer reservoir edge of the first transfer slot before the level of fluid in the straw reaches a mouthpiece vent.

4. The limited flow cup of claim 1, further comprising a vent system that prevents excess liquid from being dispensed to the user.

5. The limited flow cup of claim 1, further comprising a lid.

6. The limited flow cup of claim 5, wherein the lid comprises a lid removal tab.

7. The limited flow cup of claim 5, wherein the lid comprises a vent system, when seated on outer and inner cup assembly, that prevents excess liquid from being dispensed to the user.

8. The limited flow cup of claim 4 or 7, wherein the vent system comprises a channel, a mouthpiece vent hole, a duct, duct vent, and a lid vent hole, wherein the system prevents the user from drawing excess fluid out of the main reservoir.

9. The limited flow cup of claim 5, wherein the lid comprises a gap for a mouthpiece of the inner cup and/or a lid flange that provides a stop point against a flange of the inner cup.

10. The limited flow cup of claim 1, wherein the inner cup comprises a pliable rubber polymer.

11. The limited flow cup of claim 1, wherein the inner cup comprises a silicone or a thermoplastic elastomer (TPE).

12. The limited flow cup of claim 1, wherein the angled transfer reservoir comprises an upper surface angle from a second transfer slot to the first transfer slot of greater than 3 degrees whereby air bubbles move from the transfer reservoir to the main liquid reservoir.

13. The limited flow cup of claim 1, wherein the transfer reservoir comprises sidewalls that tapper from the first transfer slot to a second transfer slot at an angle from about 5 to 20 degrees.

14. The limited flow cup of claim 1, wherein the inner cup is fully seated in the outer cup via a tab lock/seating feature mated with a cutout lock/seating feature.

15. A method for manufacturing the limited flow cup of claim 1, the method comprising positioning the inner cup in the outer cup to provide an assembled limited flow cup such that liquid can be contained within the same and the amount of contained liquid released upon tilting of the assembled cup is limited.

16. The method of claim 15, further comprising positioning a lid on the assembled inner and outer cup.

17. A limited flow drinking cup for dispensing a predetermined volume of liquid to a user each time the limited flow cup is tilted to a drinking position, comprising:

a) an outer cup;

b) an inner cup nested within the outer cup, wherein the inner cup is configured to contain a supply of the liquid in a main liquid reservoir and is in fluid communication with the outer cup;

c) a transfer reservoir formed when the inner cup is fully seated within the outer cup and configured to measure the predetermined volume of liquid to the user, wherein the transfer reservoir is in fluid communication via a first transfer slot with the supply of the liquid contained in the inner cup; and, d) a straw configured for dispensing the predetermined volume of the liquid to the user wherein the straw is in fluid communication with the transfer reservoir via a second transfer slot;

wherein the transfer reservoir is angled and configured to provide a ramp allowing air to escape into the inner cup and not remain trapped in the transfer reservoir or the straw; and wherein the transfer reservoir fills with the liquid providing the measured predetermined volume of liquid when in an upright position and is prevented from filling when the cup is tilted in the drinking position providing the user with a single predetermined volume of liquid.

18. The limited flow cup of claim 17, further comprising a vent system that prevents excess liquid from being dispensed to the user.

19. The limited flow cup of claim 17, further comprising a lid.

20. The limited flow cup of claim 19, wherein the lid comprises a lid removal tab.

21. The limited flow cup of claim 19, wherein the lid comprises a vent system, when seated on an outer and inner cup assembly, that prevents excess liquid from being dispensed to the user.

22. The limited flow cup of claim 18 or 21, wherein the vent system comprises a channel, a mouthpiece vent hole, a duct, duct vent, and a lid vent hole, wherein the system prevents the user from drawing excess fluid out of the main reservoir.

23. The limited flow cup of claim 19, wherein the lid comprises a gap for a mouthpiece of the inner cup and/or a lid flange that provides a stop point against a flange of the inner cup.

24. The limited flow cup of claim 19, wherein the lid comprises a gap for a mouthpiece of the inner cup.

25. The limited flow cup of claim 17, wherein the inner cup comprises a pliable rubber polymer.

26. The limited flow cup of claim 17, wherein the inner cup comprises a silicone or a thermoplastic elastomer (TPE).

27. The limited flow cup of claim 17, wherein the transfer reservoir comprises an upper surface angle from the second transfer slot to the first transfer slot of greater than 3 degrees whereby air bubbles move from the transfer reservoir to the main liquid reservoir.

28. The limited flow cup of claim 17, wherein the transfer reservoir comprises sidewalls that tapper from the first transfer slot to the second transfer slot at an angle from about 5 to 20 degrees.

29. The limited flow cup of claim 17, wherein the inner cup is fully seated in the outer cup via a tab lock/seating feature mated with a cutout lock/seating feature.

30. The limited flow cup of claim 17, wherein the main liquid reservoir comprises a fill line configured such that when the limited flow cup is tilted the liquid level is below a transfer reservoir edge of the first transfer slot before the level of fluid in the straw reaches a mouthpiece vent.

31. A limited flow cup (100) comprising an outer cup, an inner cup, and lid, wherein:

the outer cup comprises open top and closed bottom sections (428), the open top being formed by an outer cup top edge, a main interior cavity (407), and an external surface, the main interior cavity having a cross section suitable for mating with the inner cup, the outer cup top edge comprising an outer cup cutout (306) for receiving the inner cup;

the inner cup comprises an open top and a closed bottom, inner cup interior and inner cup exterior side walls, the open top being formed by an inner cup top edge comprising an inner cup flange (511) and a raised section providing a mouthpiece (609) comprising a channel (610), the inner cup interior comprising a mouthpiece vent hole (621) through which fluid can flow, wherein the inner cup top edge can interlock with the outer cup cutout to seat the inner cup within the outer cup, the closed bottom comprising an inner cup bottom interior and an inner cup bottom exterior comprising a recessed portion continuous with a recessed portion of the inner cup exterior side walls;

wherein when attached to one another, the outer cup and inner cup provide a fluid transfer reservoir (815) continuous with the inner cup recessed portions and the mouthpiece vent hole;

the lid comprises lid exterior and lid interior surfaces, the exterior surface comprising an upper recessed portion surrounded by a raised lid edge, the interior surface contacting the inner cup in an assembled form of the cup, the lid interior surface comprising an interior raised portion facing the interior of the inner cup, a flange (1336) providing a stop point against the inner cup flange, a removal tab (1333), a gap (1235) to accommodate the inner cup mouthpiece, two seal beads (1230) encircling the interior raised portion such that a duct (1134) is created between the two beads, a duct vent (1232) in the interior raised portion connecting the duct to the lid interior surface, a lid vent (1231) connecting the lid interior surface to an outside atmosphere;

wherein a conduit provided by the mouthpiece channel (610), mouthpiece vent hole (621), duct (1134), duct vent (1232), and lid vent (1231) prevents the user from drawing excess fluid out of the main reservoir (1023) since any sucking motion will pull air from outside the limited flow cup (100).

32. A method for using the limited flow cup of claim 1, 12 or 31, the method comprising filling and/or drinking a liquid contained within the cup.

* * * * *